US007695870B2

(12) United States Patent
Park et al.

(10) Patent No.: US 7,695,870 B2
(45) Date of Patent: *Apr. 13, 2010

(54) ORGANIC/INORGANIC COMPOSITE SEPARATOR AND ELECTROCHEMICAL DEVICE CONTAINING THE SAME

(75) Inventors: Jong-Hyeok Park, Daejeon (KR); Sang-Young Lee, Daejeon (KR); Jang-Hyuk Hong, Daejeon (KR); Moon-Ja Nam, Daejeon (KR); Jung-A Yoo, Daejeon (KR); Sang-Seop Kim, Seoul (KR); Chang-Hun Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/158,936

(22) PCT Filed: Mar. 6, 2008

(86) PCT No.: PCT/KR2008/001263

§ 371 (c)(1),
(2), (4) Date: Mar. 23, 2009

(87) PCT Pub. No.: WO2008/108583

PCT Pub. Date: Sep. 12, 2008

(65) Prior Publication Data
US 2009/0246613 A1 Oct. 1, 2009

(30) Foreign Application Priority Data
Mar. 7, 2007 (KR) .............. 10-2007-0022320

(51) Int. Cl.
*H01M 2/16* (2006.01)
*H01M 2/18* (2006.01)
*H01M 10/04* (2006.01)
*H01M 4/48* (2006.01)
*B05D 5/12* (2006.01)
*B05C 5/00* (2006.01)

(52) U.S. Cl. .............. 429/251; 429/252; 429/30; 429/44; 429/137; 429/231.1; 429/134; 427/115; 502/101; 252/511

(58) Field of Classification Search .......... 429/30, 429/44, 137, 231.1, 34, 249, 251, 252; 427/115; 502/101; 252/511; *H01M 2/16, 2/18, 10/04, H01M 4/48*
See application file for complete search history.

(56) References Cited

U.S. PATENT DOCUMENTS
5,256,503 A * 10/1993 Cook et al. .............. 429/249
(Continued)

FOREIGN PATENT DOCUMENTS
CN 1569318 * 1/2005
(Continued)

*Primary Examiner*—Melvin C Mayes
*Assistant Examiner*—Jun Li
(74) *Attorney, Agent, or Firm*—Birch, Stewart, Kolasch & Birch, LLP

(57) ABSTRACT

An organic/inorganic composite separator includes a porous substrate having a plurality of pores; and a porous coating layer formed on at least one surface of the porous substrate with a plurality of inorganic particles and a binder polymer. The binder polymer is a copolymer including: (a) a first monomer unit having a contact angle to a water drop in the range from 0° to 49°; and (b) a second monomer unit having a contact angle to a water drop in the range from 50° to 130°. This organic/inorganic composite separator has excellent thermal stability, so it may restrain an electric short circuit between a cathode and an anode. In addition, the separator may prevent inorganic particles in the porous coating layer from being extracted during an assembling process of an electrochemical device, thereby improving stability of an electrochemical device.

19 Claims, 3 Drawing Sheets

U.S. PATENT DOCUMENTS

| | | | |
|---|---|---|---|
| 6,048,641 A * | 4/2000 | Ohmory et al. | 429/142 |
| 2002/0029465 A1 | 3/2002 | Shida et al. | |
| 2004/0115499 A1 | 6/2004 | Tani et al. | |
| 2005/0048367 A1 | 3/2005 | Igaki et al. | |
| 2006/0121329 A1 | 6/2006 | Shishitani et al. | |

FOREIGN PATENT DOCUMENTS

| | | |
|---|---|---|
| KR | 10-2001-0082058 A | 8/2001 |
| KR | 10-2001-0082059 A | 8/2001 |
| KR | 10-2006-0072065 A | 6/2006 |
| KR | 10-2007-0000231 A | 1/2007 |
| WO | WO 2006068428 A1 * | 6/2006 |

* cited by examiner

ORGANIC/INORGANIC COMPOSITE SEPARATOR AND ELECTROCHEMICAL DEVICE CONTAINING THE SAME

TECHNICAL FIELD

The present invention relates to a separator of an electrochemical device such as a lithium secondary battery and an electrochemical device containing the same. More particularly, the present invention relates to an organic/inorganic composite separator having a porous coating layer formed with a mixture of inorganic particles and polymer on a surface of a porous substrate, and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, the research and development into a novel electrode and a novel battery that can improve capacity density and specific energy have been made intensively in the field of the secondary batteries.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity than those of the lithium ion batteries and an insufficient discharging capacity in low temperature, and therefore these disadvantages of the lithium-ion polymer batteries remain to be urgently solved.

Such electrochemical devices have been produced from many companies, and the battery stability has different phases in the electrochemical devices. Accordingly, it is important to evaluate and ensure the stability of the electrochemical batteries. First of all, it should be considered that errors in operation of the electrochemical device should not cause damage to users. For this purpose, the Safety Regulation strictly regulates ignition and explosion in the electrochemical devices. In the stability characteristics of the electrochemical device, overheating of the electrochemical device may cause thermal runaway, and explosion may occur when a separator is pierced. In particular, a polyolefin porous substrate commonly used as a separator of an electrochemical device shows extreme thermal shrinking behavior at a temperature of 100° C. or above due to the features of its material and its manufacturing process such as elongation, so there may occur an electric short circuit between cathode and anode.

In order to solve the above safety-related problems of the electrochemical device, Korean Laid-open Patent Publication No. 10-2006-72065 and No. 10-2007-231 disclose an organic/inorganic composite separator 10 having a porous coating layer formed by coating at least one surface of a porous substrate 1 having many pores with a mixture of inorganic particles 3 and a binder polymer 5 (see FIG. 1). In the organic/inorganic composite separator, the inorganic particles 3 in the porous coating layer formed on the porous substrate 1 act as a kind of spacer that keeps a physical shape of the porous coating layer, so the inorganic particles restrain thermal shrinkage of the porous substrate when the electrochemical device is overheated. In addition, interstitial volumes exist among the inorganic particles, thereby forming fine pores.

As mentioned above, at least a certain amount of inorganic particles should be contained such that the porous coating layer formed on the organic/inorganic composite separator may restrain thermal shrinkage of the porous substrate. However, as the content of inorganic particles is increased, a content of binder polymer is relatively decreased, which may cause inorganic particles to be extracted from the porous coating layer due to the stress generated in an assembly process of an electrochemical device such as winding. The extracted inorganic particles act as a local defect of the electrochemical device, thereby giving a bad influence on the stability of the electrochemical device.

DISCLOSURE OF INVENTION

Technical Problem

The present invention is designed to solve the problems of the prior art, and therefore an object of the invention is to provide an organic/inorganic composite separator, which has good thermal stability so as to restrain an electric short circuit between cathode and anode even when an electrochemical device is overheated, and also which may improve stability of the electrochemical device by preventing extraction of inorganic particles in a porous coating layer formed on a porous substrate during an assembly process of the electrochemical device.

Technical Solution

In order to accomplish the first object, the present invention provides an organic/inorganic composite separator, which includes a porous substrate having a plurality of pores; and a porous coating layer formed on at least one surface of the porous substrate with a plurality of inorganic particles and a binder polymer, wherein the binder polymer is a copolymer including: (a) a first monomer unit having a contact angle to a water drop in the range from 0° to 49°; and (b) a second monomer unit having a contact angle to a water drop in the range from 50° to 130°.

The organic/inorganic composite separator according to the present invention has an excellent peeling resistance, so it may prevent inorganic particles in the porous coating layer from being extracted during an assembling process of an electrochemical device. Also, though an electrochemical device is overheated, thermal shrinkage is restrained, which allows to prevent any electric short circuit between cathode and anode. Accordingly, the safety of the electrochemical device is greatly improved.

In the organic/inorganic composite separator according to the present invention, the first monomer unit is preferably a monomer unit having at least one functional group selected from the group consisting of OH, COOH, MAH (maleic anhydride) and $SO_3H$, and the second monomer unit is preferably a monomer unit having at least one functional group selected from the group consisting of F, Cl, CN, acrylate, acetate and ester.

The copolymer may be a copolymer selected from the group consisting of acrylonitrile-maleic anhydride copolymer, acrylonitrile-vinylalcohol copolymer, cyanoethylene-vinylalcohol copolymer, cyanoethylene-cellulose copolymer, cyanoethylene-sucrose copolymer, acrylonitrile-acrylic acid copolymer, acrylonitrile-anhydrous maleic acid copolymer, acrylate-acrylic acid copolymer and acrylate-anhydrous maleic acid copolymer, or their mixtures.

The organic/inorganic composite separator according to the present invention may be used for an electrochemical device such as a lithium secondary battery or a super capacity device as being interposed between a cathode and an anode.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE

Figure 1:
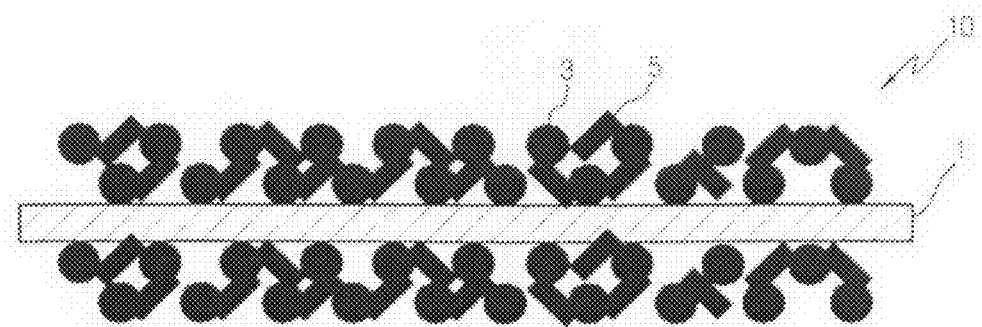
FIG. 1 is a sectional view schematically showing an organic/inorganic composite separator.

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

An organic/inorganic composite separator of the present invention includes a porous substrate having a plurality of pores; and a porous coating layer formed with a plurality of inorganic particles and a binder polymer. Here, the binder polymer is a copolymer including (a) a first monomer unit having a contact angle to a water drop in the range from 0° to 49°; and (b) a second monomer unit having a contact angle to a water drop in the range from 50° to 130°. This copolymer may be expressed as follows: (first monomer unit)$_m$-(second monomer unit)$_n$ (0<m<1, 0<n<1). At this time, the copolymer including the first monomer unit and the second monomer unit may be any kind of copolymer such as random copolymer and block copolymer. The first monomer unit preferably has a molar ratio in the range from 1 to 20 mol % based on the entire copolymer, and the entire copolymer preferably has a contact angle to a water drop in the range from 30° to 80°. It would be apparent to those having ordinary skill in the art that the above copolymer may further include another monomer unit without obstructing the object of the present invention, and another binder polymer may be mixed thereto in addition to the above copolymer without obstructing the object of the present invention.

In the present invention, after a sample film was made using a single monomer of a corresponding binder polymer, a distilled water drop was fallen thereon, and then a contact angle formed on the water drop was set as 23 degrees. Also, the contact angle to a water drop was measured using a contact angle measurer model CA-DT-A (mfd. produced by Kyowa Kaimen Kagaku KK) under the condition of 50% RH. Contact angles were measured at two points (namely, left and right points) of each of three sample films, and six measured values were averaged and set as a contact angle. The distilled water drop has a diameter of 2 mm, and the contact angle value displayed on the measurer shows a contact angle measured 1 minute after the distilled water drop was fallen.

Among the monomer units that constitute the copolymer, the first monomer unit having a contact angle to a water drop in the range from 0° to 49°, preferably from 5° to 30°, shows a relatively greater hydrophile property than the second monomer unit, so the first monomer unit attributes to improving an adhering characteristic among inorganic particles. Also, the second monomer unit having a contact angle to a water drop in the range from 50° to 130°, preferably from 70° to 120°, shows a relatively greater hydrophobic property than the first monomer unit, so the second monomer unit attributes to improving an adhering characteristic between inorganic properties and the porous substrate. Thus, when the above copolymer is used as a binder polymer for the porous coating layer, it is possible to increase a peeling resistance of the porous coating layer rather than the case using a conventional polymer binder. Accordingly, it is possible to lower a content ratio of the binder polymer of the porous coating layer and increase a content ratio of inorganic particles, which allows to further restrain thermal shrinkage of the organic/inorganic composite separator. In addition, a porosity of the porous coating layer is increased, which attributes to improving the performance of an electrochemical device. Also, since an adhesive force between the porous coating layer and the porous substrate is strong, the porous coating layer may sufficiently exhibit its function to restrain thermal shrinkage of the porous substrate even though the electrochemical device is overheated. Accordingly, the stability of the electrochemical device is greatly improved.

In the organic/inorganic composite separator according to the present invention, the porous coating layer preferably has a peeling force of 5 gf/cm or above in view of preventing extraction of inorganic particles in the porous coating layer during the assembling process of the electrochemical device.

In the organic/inorganic composite separator according to the present invention, the first monomer unit is preferably a monomer unit having at least one functional group selected from the group consisting of OH, COOH, MAH (maleic anhydride) and SO$_3$H, and the second monomer unit is preferably a monomer unit having at least one functional group selected from the group consisting of F, Cl, CN, acrylate, acetate and ester.

The copolymer including the first monomer unit and the second monomer unit may employ acrylonitrile-maleic anhydride copolymer, acrylonitrile-vinylalcohol copolymer, cyanoethylene-vinylalcohol copolymer, cyanoethylene-cellulose copolymer, cyanoethylene-sucrose copolymer, acrylonitrile-acrylic acid copolymer, acrylonitrile-anhydrous maleic acid copolymer, acrylate-acrylic acid copolymer or acrylate-anhydrous maleic acid copolymer, in single or in combination.

In the organic/inorganic composite separator according to the present invention, the inorganic particle used for forming the porous coating layer is not specially limited if it is electrically and chemically stable. That is to say, an inorganic particle usable in the present invention is not specially limited if oxidation or reduction reaction does not occur in an operating voltage range (for example, 0 to 5V based on Li/Li$^+$) of an applied electrochemical device. In particular, in case an inorganic particle with ion transferring capability is used, it is possible to enhance the performance by increasing ion conductivity in the electrochemical device.

In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles include inorganic particles having a dielectric constant of 5 or above, preferably 10 or above, inorganic particles having lithium-ion transferring capability, or their mixtures. The inorganic particle having a dielectric constant of 5 or above is for example $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$-$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, but not limitedly.

In particular, the inorganic particles such as of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$-$PbTiO_3$ (PMN-PT) and hafnia ($HfO_2$) show a high dielectric constant of 100 or above and have piezoelectricity since charges are generated to make a potential difference between both surfaces when a certain pressure is applied to extend or shrink them by applying a certain pressure thereto, so the above inorganic particles may prevent generation of an internal short circuit of both electrodes caused by an external impact and thus further improve the stability of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in the battery and also improve the performance of the battery. The inorganic particle having lithium ion transferring capability is any one inorganic particle or a mixture of at least two inorganic particles selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ ($Li_xSi_yS_z$, $0<x<3$, $0<y<2$, $0<z<4$) type glass, and $P_2S_5$ ($Li_xP_yS_z$, $0<x<3$, $0<y<3$, $0<z<7$) type glass, but not limitedly.

In the organic/inorganic composite separator according to the present invention, the size of inorganic particles in the porous coating layer is not specially limited, but it is preferably in the range from 0.001 to 10 µm, if possible, in order to form a coating layer in a uniform thickness and ensure suitable porosity. If the particle size is less than 0.001 µm, a dispersing property is deteriorated, so it is not easy to control properties of the organic/inorganic composite separator. If the particle size exceeds 10 µm, the thickness of the porous coating layer is increased, which may deteriorate mechanical properties. In addition, due to excessively great pore size, the possibility of internal short circuit is increased while charging or discharging a battery.

In the organic/inorganic composite separator coated with the porous coating layer according to the present invention, a weight ratio of the inorganic particles and the binder polymer is in the range from 50:50 to 99:1, more preferably from 70:30 to 95:5. If the weight ratio of the organic particles to the binder polymer is less than 50:50, the content of polymer is so great that the thermal stability of the organic/inorganic composite separator may not be much improved. In addition, pore size and porosity may be decreased due to the decrease of interstitial volume formed among the inorganic particles, thereby causing deterioration of the performance of a battery. If the weight ratio exceeds 99:1, the peeling resistance of the porous coating layer may be weakened since the content of binder polymer is so small. The thickness of the porous coating layer composed of the inorganic particles and the binder polymer is not specially limited but preferably in the range from 0.01 to 20 µm. Also, pore size and porosity are not specially limited, but the pore size is preferably ranged from 0.001 to 10 µm and a porosity is preferably ranged from 10 to 90%. The pore size and porosity are mainly dependent on the size of inorganic particles. For example, in case inorganic particles have a diameter of 1 µm or less, the formed pore is also approximately 1 µm or less. The pores as mentioned above are filled with electrolyte later, and the filled electrolyte plays a role of transferring ions. In case the pore size and porosity are respectively less than 0.001 µm and 10%, the porous coating layer may act as a resistance layer. In case the pore size and porosity are respectively greater than 10 µm and 90%, mechanical properties may be deteriorated.

The organic/inorganic composite separator according to the present invention may further include other additives as components of the porous coating layer, in addition to the inorganic particles and the polymer.

In addition, in the organic/inorganic composite separator according to the present invention, the porous substrate having a plurality of pores may adopt any kind of porous substrate if it is commonly used as a separator of an electrochemical device like a polyolefin porous substrate. For example, the porous substrate may be a non-woven fabric or a membrane formed using a polyolefin polymer containing polyethylene such as HDPE (high density polyethylene), LLDPE (linear low density polyethylene, LDPE (low density polyethylene) and UHMWPE (ultra high molecular weight polyethylene), polypropylene, polybutylene or polypentene, in single or in combination. The porous substrate preferably has a thickness of 5 to 50 µm, though not limited thereto, and also the pore size and porosity of the porous substrate are preferably 0.01 to 50 µm and 10 to 95%, respectively, though not limited thereto.

Hereinafter, a method for manufacturing an organic/inorganic composite separator having a porous coating layer according to the present invention is explained as an example, but the present invention is not limited thereto.

First, a copolymer including the first and second monomer units with the aforementioned contact angles to a water drop is dissolved in a solvent to make a binder polymer solution.

Subsequently, inorganic particles are added to the binder polymer solution and then dispersed therein. The solvent preferably has a solubility parameter similar to that of the used binder polymer and a low boiling point. It will help uniform mixture and easy removal of the solvent afterward. A non-limiting example of usable solvent includes acetone, tetrahydrofuran, methylene chloride, chloroform, dimethylformamide, N-methyl-2-pyrrolidone (NMP), cyclohexane, water and mixtures thereof. It is preferred that the inorganic particles are pulverized after being added to the binder polymer solution. At this time, the time required for pulverization is suitably 1 to 20 hours, and the particle size of the pulverized particles ranges preferably from 0.001 and 10 µm, as mentioned above. Conventional pulverization methods may be used, and a method using a ball mill is particularly preferred.

After that, the polyolefin porous substrate is coated with the binder polymer solution in which the inorganic particles are dispersed, under the humidity condition of 10 to 80%, and then dried.

In order to coat the porous substrate with the binder polymer solution in which the inorganic particles are dispersed, a common coating method well known in the art may be used. For example, various methods such as dip coating, die coating, roll coating, comma coating or their combinations may be used. In addition, the porous coating layer may be formed selectively on both surfaces or only one surface of the porous substrate.

The organic/inorganic composite separator manufactured as mentioned above may be used as a separator of an electrochemical device. Namely, the organic/inorganic composite separator may be usefully used as a separator interposed between a cathode and an anode. At this time, in case a gellable polymer is used as a binder polymer component when a liquid electrolyte is impregnated, after a battery is assembled using the separator, the injected electrolyte and polymer may be reacted and then gelled, thereby forming a gel-type organic/inorganic composite electrolyte.

The electrochemical device may be any device in which electrochemical reactions may occur, and a specific example of the electrochemical devices includes all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device may be manufactured according to common methods well known to the art. As one embodiment of the method for manufacturing an electrochemical device, an electrochemical device may be manufactured by interposing the above-mentioned organic/inorganic composite separator between a cathode and an anode and injecting an electrolyte solution therein.

There is no special limitation in the electrodes that may be used together with an organic/inorganic composite separator of the present invention, and the electrodes may be manufactured by settling electrode active materials on a current collector according to one of common methods well known in the art. Among the electrode active materials, a non-limiting example of cathode active materials may include any conventional cathode active materials currently used in a cathode of a conventional electrochemical device. Particularly, lithium manganese oxides, lithium cobalt oxides, lithium nickel oxides, lithium iron oxides or lithium composite oxides thereof are preferred as the cathode active materials. Also, a non-limiting example of anode active materials may include any conventional anode active materials currently used in an anode of a conventional electrochemical device. Particularly, lithium intercalation materials such as lithium metal, lithium alloys, carbon, petroleum coke, activated carbon, graphite or other carbonaceous materials are preferred as the anode active materials. A non-limiting example of a cathode current collector includes a foil formed of aluminum, nickel or a combination thereof. A non-limiting example of an anode current collector includes a foil formed of copper, gold, nickel, copper alloys or a combination thereof.

The electrolyte solution that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an salt containing an anion selected from the group consisting of $PF_6^-$, $BF_4^-$, $Cl^-$, $Br_-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. The salt may be dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte solution that may be used in the present invention is not limited to the above examples.

More particularly, the electrolyte solution may be injected in a suitable step during the manufacturing process of a battery, according to the manufacturing process and desired properties of a final product. In other words, the electrolyte solution may be injected before a battery is assembled or during a final step of the assembly process of a battery.

In order to apply the organic/inorganic composite separator according to the present invention to a battery, a stacking (or, laminating) process or a folding process may be used in addition to a winding process that is most commonly used. The organic/inorganic composite separator of the present invention has an excellent peeling resistance, so the inorganic particles are not easily extracted during the battery assembly process.

MODE FOR INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

EXAMPLE 1

5 weight % of butylacrylate-acrylic acid copolymer containing 5 mol % of acrylic acid unit (a contact angle of the butylacrylate unit to a water drop was 80° and a contact angle of the acrylic acid unit to a water drop was 10°) was added to acetone and dissolved at 50° C. for about 12 hours to make a binder polymer solution. $BaTiO_3$ powder was added to the prepared binder polymer solution at a weight ratio of polymer mixture/$BaTiO_3$=10/90, and then the $BaTiO_3$ powder was pulverized and dispersed for 12 hours or more by ball milling to make a slurry. In the prepared slurry, the diameter of $BaTiO_3$ may be controlled according to a size (or, diameter) of used beads and the time for the ball milling, but in this example 1, the $BaTiO_3$ powder was pulverized into about 400 nm to make the slurry. The prepared slurry was used for coating a polyethylene porous separator (having a porosity of 45%) with a thickness of 12 µm by means of dip coating, and a coating thickness was controlled to be about 8 µm. A pore size in the porous coating layer formed on the polyethylene porous separator was in the level of 0.4 µm, and a porosity was in the level of 57%.

EXAMPLE 2

An organic/inorganic composite separator was prepared in the same way as the example 1, except that acrylonitrile-acrylic acid copolymer containing 5 mol % of acrylic acid unit (a contact angle of the acrylonitrile unit to a water drop was 85°) was used instead of the butylacrylate-acrylic acid copolymer.

EXAMPLE 3

An organic/inorganic composite separator was prepared in the same way as the example 1, except that $Al_2O_3$ powder was used instead of $BaTiO_3$ powder.

EXAMPLE 4

An organic/inorganic composite separator was prepared in the same way as the example 1, except that a content ratio of binder polymer/$BaTiO_3$ was changed into 5/95.

COMPARATIVE EXAMPLE 1

An organic/inorganic composite separator was prepared in the same way as the example 1, except that butylacrylate homopolymer was used instead of the butylacrylate-acrylic acid copolymer.

COMPARATIVE EXAMPLE 2

An organic/inorganic composite separator was prepared in the same way as the example 1, except that acrylic acid homopolymer was used instead of the butylacrylate-acrylic acid copolymer. However, since the acrylic acid homopolymer was not dissolved in acetone that is a solvent, it was impossible to make a slurry for forming a porous coating layer.

COMPARATIVE EXAMPLE 3

An organic/inorganic composite separator was prepared in the same way as the example 1, except that acrylonitrile homopolymer was used instead of the butylacrylate-acrylic acid copolymer.

Preparation of Anode 96 weight % of carbon powder as an anode active material, 3 weight % of polyvinylidene fluoride (PVdF) as coupling agent and 1 weight % of carbon black as a conductive material were respectively added to N-methyl-2 pyrrolidone (NMP) as a solvent to make an anode mixture slurry. The anode mixture slurry was applied to a copper (Cu) film, which is an anode current collector with a thickness of 10 µm, and then dried to make an anode, and then roll pressing was conducted thereto.

Preparation of Cathode 92 weight % of lithium cobalt composite oxide as a cathode active material, 4 weight % of carbon black as a conductive material and 4 weight % of PVdF as a coupling agent were respectively added to N-methyl-2 pyrrolidone (NMP) as a solvent to make a cathode mixture slurry. The cathode mixture slurry was applied to an aluminum (Al) film, which is a cathode current collector with a thickness of 20 µm, and then dried to make a cathode, and then roll pressing was conducted thereto.

Manufacture of Battery

A battery was manufactured using the organic/inorganic composite separator and the electrodes prepared as above, and then its performance and safety were tested.

The battery was assembled in a way of stacking the anode, the cathode and the porous organic/inorganic composite separator, and then an electrolyte (ethylenecarbonate (EC)/ethylmethylcarbonate (EMC)=½ (a volume ratio), 1 mol of lithiumhexafluorophosphate (LiPF6).

Analysis of Surface of Organic/Inorganic Composite Separator

Figure 2:
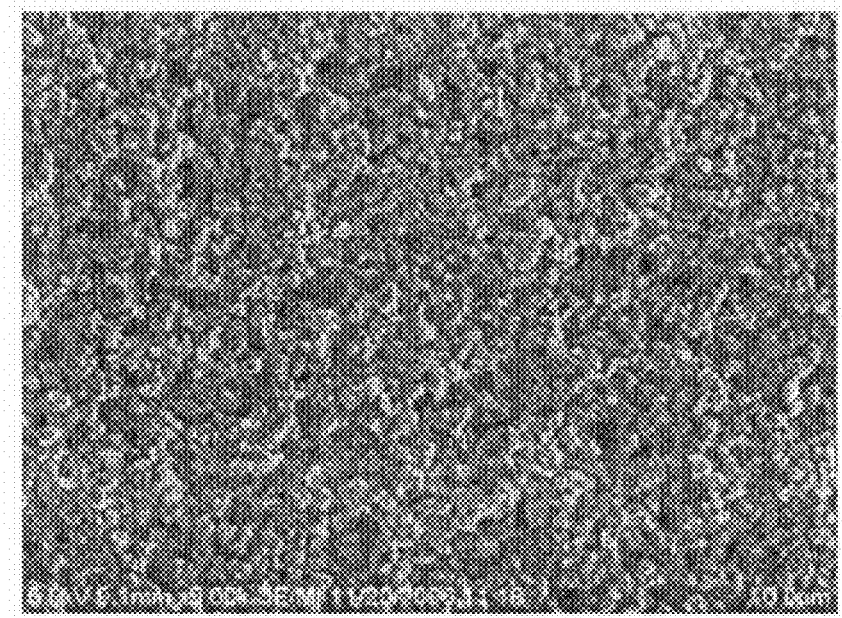
FIG. 2 a photograph showing a surface of a porous coating layer and a surface of a polyethylene porous film of an organic/inorganic composite separator according to one embodiment of the present invention, taken by a SEM (Scanning Electron Microscope)
Figure 2:
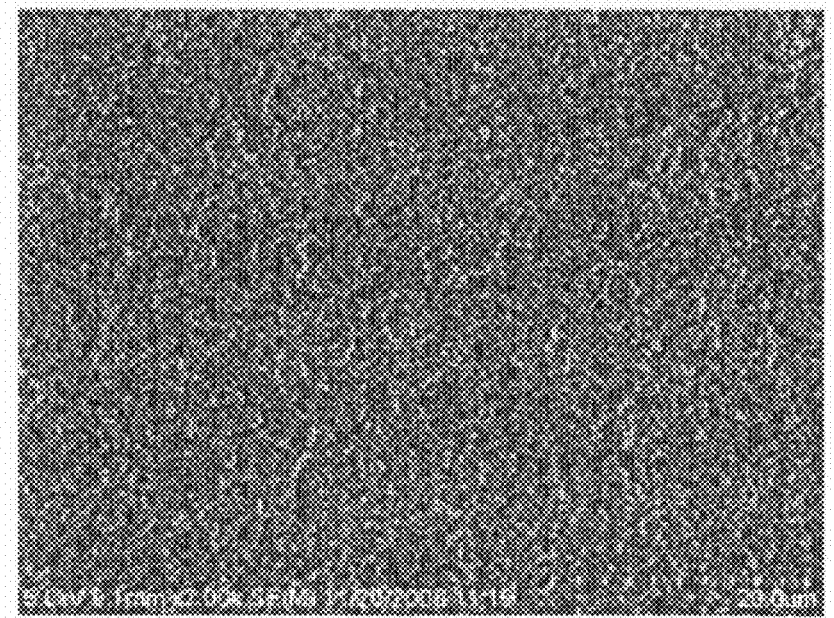

FIG. 2 is a photograph showing a surface of the porous coating layer and a surface of the polyethylene porous film of the organic/inorganic composite separator manufactured according to the example 1, taken using SEM (Scanning Electron Microscope). Seeing FIG. 2, it would be found that the porous coating layer and the polyethylene porous film show a uniform pore size of about 1 µm or less.

Evaluation of Thermal Shrinkage of Organic/Inorganic Composite Separator

The organic/inorganic composite porous films coated with electrode active material, manufactured according to the examples 1 to 4 and the comparative examples 1 to 3, were stored at 150° C. for 1 hour, and then their thermal shrinkages were evaluated and then listed in the following table 1.

Figure 3:
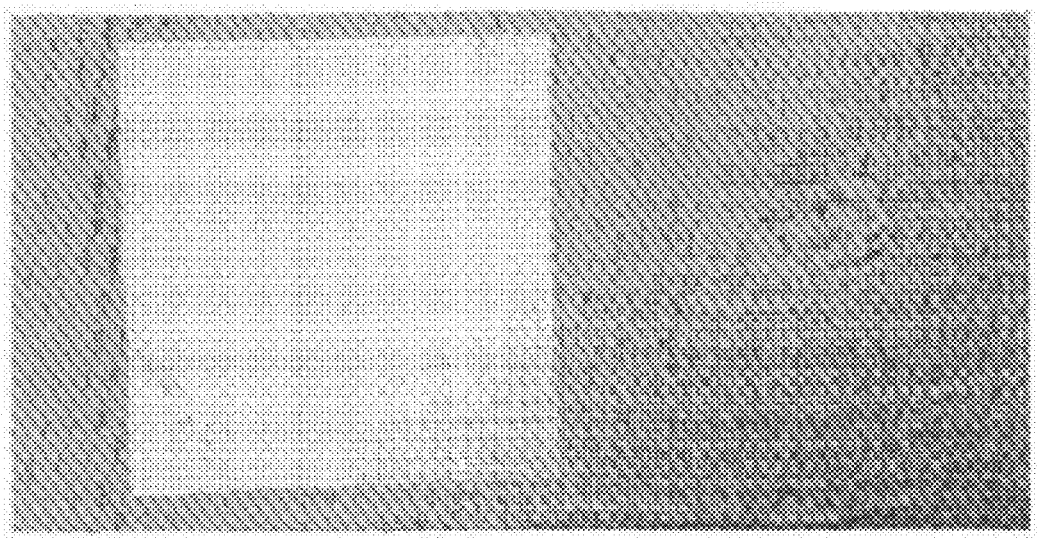
FIG. 3 is a photograph showing an organic/inorganic composite separator according to one embodiment of the present invention, taken after the separator is left alone in an oven at 150° C. for 1 hour.

As a result of the experiment, the examples 1 to 4 showed a thermal shrinkage substantially less than 10%, but the comparative examples 1 to 3 showed a thermal shrinkage of 60% or above. Meanwhile, FIG. 3 is a photograph showing the organic/inorganic composite separator according to the example 1 of the present invention, taken after the separator is left alone in an oven at 150° C. for 1 hour.

TABLE 1

| Condition | Examples | | | | Comparative Examples | |
|---|---|---|---|---|---|---|
| | 1 | 2 | 3 | 4 | 1 | 3 |
| Thermal shrinkage | <10% | <10% | <10% | <5% | 60% | 60% |

Evaluation of Peeling Resistance of Organic/Inorganic Composite Separator

The following experiment was conducted in order to evaluate peeling resistances of the porous coating layers formed in the organic/inorganic composite separators according to the examples and the comparative examples. The term 'peeling force of the porous coating layer' used herein means a peeling force measured according to the following test.

A double-sided adhesive tape was used to fix each organic/inorganic composite separator according to the examples 1 to 4 and the comparative examples 1 to 3 on a glass plate, and then a tape (a transparent tape produced by 3M) was firmly attached to the exposed porous coating layer.

Figure 4:
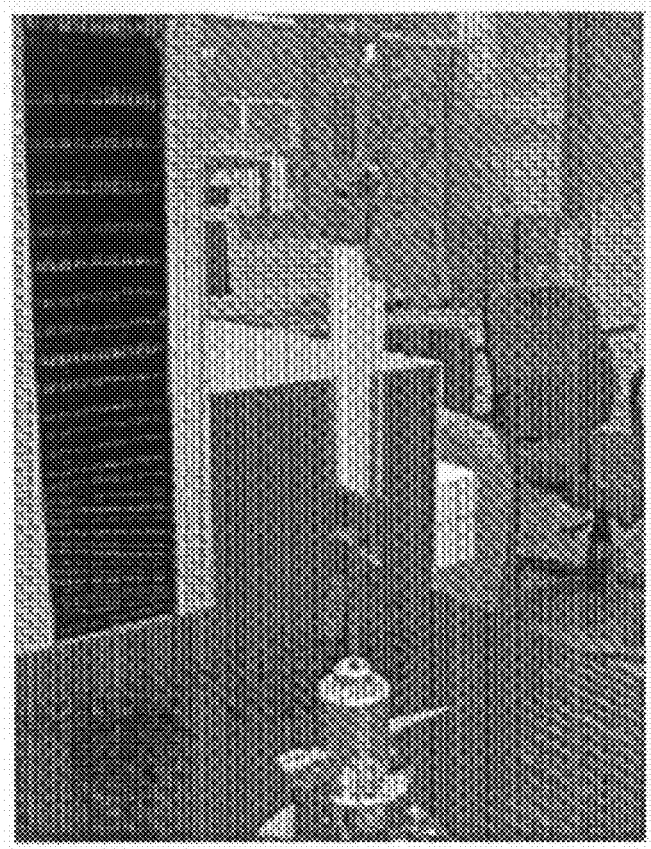
FIG. 4 is a photograph showing a test device used for measuring a peeling force of a porous coating layer of the organic/inorganic composite separator.
Figure 5:
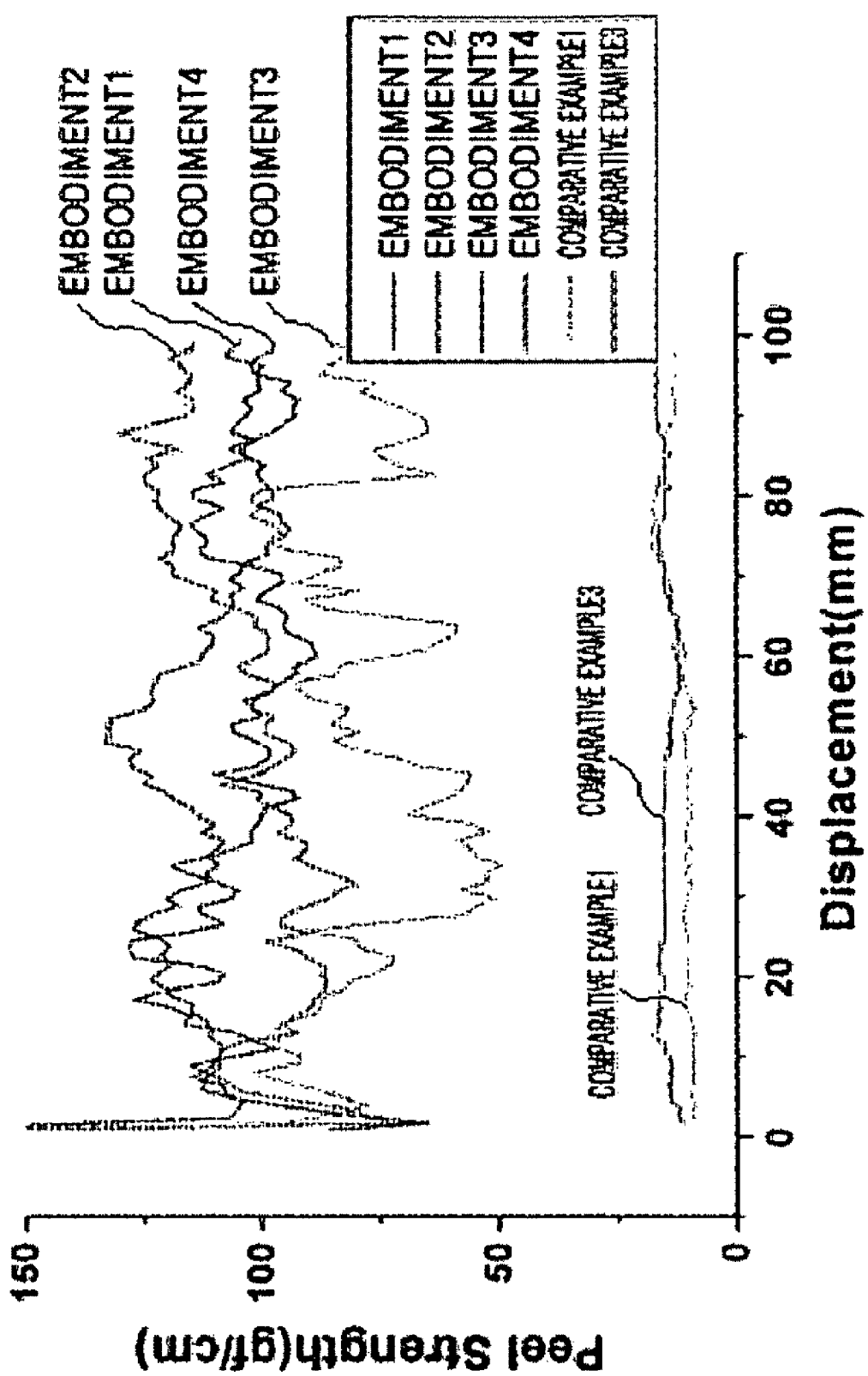
FIG. 5 is a graph showing measurement results of peeling forces of porous coating layers according to embodiments of the present invention and comparative examples.

Subsequently, as shown in FIG. 4, a force required for detaching the tape was measured using a tensile force measuring device to evaluate a peeling force of the porous coating layer. FIG. 5 shows a graph obtained accordingly.

Test for Battery Performance

The batteries respectively having cathode and anode capacities of 30 mAh were charged by 0.5 C and then discharged by 1.0 C, and their discharging capacities are listed in the following table 2. It would be understood that the performance of the cells according to the examples 1 to 4 are greatly improved in comparison to the comparative examples 1 to 3.

TABLE 2

|  | Examples | | | | Comparative Examples | |
|---|---|---|---|---|---|---|
| Condition | 1 | 2 | 3 | 4 | 1 | 3 |
| Capacity | 30.14 | 30.12 | 30.18 | 30.21 | 28.43 | 28.50 |

INDUSTRIAL APPLICABILITY

As described above, the organic/inorganic composite separator coated with a porous coating layer according to the present invention has excellent thermal stability, so it may restrain an electric short circuit between a cathode and an anode. In addition, the problem that inorganic particles in the porous coating layer formed on a porous substrate are extracted during an assembling process of an electrochemical device may be solved. Also, since an adhesive force between the porous coating layer and the porous substrate is strong, the porous coating layer may sufficiently exhibit its function to restrain thermal shrinkage of the porous substrate even though the electrochemical device is overheated. Accordingly, the present invention allows to greatly improve safety of the electrochemical device and attributes to improving battery performance.

What is claimed is:

1. An organic/inorganic composite separator, which includes a porous substrate having a plurality of pores, and a porous coating layer formed on at least one surface of the porous substrate with a plurality of inorganic particles and a binder polymer,
   wherein the binder polymer is a copolymer including:
   (a) a first monomer unit having a contact angle to a water drop in the range from 0° to 49°; and
   (b) a second monomer unit having a contact angle to a water drop in the range from 50° to 130°.

2. The organic/inorganic composite separator according to claim 1,
   wherein the first monomer unit has a contact angle to a water drop in the range from 5° to 30°, and the second monomer unit has a contact angle to a water drop in the range from 70° to 120°.

3. The organic/inorganic composite separator according to claim 1,
   wherein the first monomer unit has a molar ratio in the range from 1 to 20 mol % based on the entire copolymer.

4. The organic/inorganic composite separator according to claim 1,
   wherein the copolymer has a contact angle to a water drop in the range from 30° to 80°.

5. The organic/inorganic composite separator according to claim 1,
   wherein the first monomer unit is a monomer unit having at least one functional group selected from the group consisting of OH, COOH, MAH (maleic anhydride) and $SO_3H$, and the second monomer unit is a monomer unit having at least one functional group selected from the group consisting of F, Cl, CN, acrylate, acetate and ester.

6. The organic/inorganic composite separator according to claim 1,
   wherein the copolymer is a copolymer selected from the group consisting of acrylonitrile-maleic anhydride copolymer, acrylonitrile-vinylalcohol copolymer, cyanoethylene-vinylalcohol copolymer, cyanoethylene-cellulose copolymer, cyanoethylene-sucrose copolymer, acrylonitrile-acrylic acid copolymer, acrylonitrile-anhydrous maleic acid copolymer, acrylate-acrylic acid copolymer and acrylate-anhydrous maleic acid copolymer.

7. The organic/inorganic composite separator according to claim 1,
   wherein the porous coating layer has a peeling force of 5 gf/cm or above.

8. The organic/inorganic composite separator according to claim 1,
   wherein the inorganic particles have a size in the range from 0.001 to 10 μm.

9. The organic/inorganic composite separator according to claim 1,
   wherein the inorganic particles are selected from the group consisting of inorganic particles having a dielectric constant of 5 or above, inorganic particles having lithium-ion transferring capability, or their mixtures.

10. The organic/inorganic composite separator according to claim 9,
    wherein the inorganic particle having a dielectric constant of 5 or above is an inorganic particle selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$-$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$.

11. The organic/inorganic composite separator according to claim 10,
    wherein the inorganic particle having a dielectric constant of 5 or above is an piezoelectric inorganic particle selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$-$PbTiO_3$ (PMN-PT) and hafnia ($HfO_2$).

12. The organic/inorganic composite separator according to claim 9,
    wherein the inorganic particle having lithium ion conductivity is an inorganic particle selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ ($Li_xSi_yS_z$, $0<x<3$, $0<y<2$, $0<z<4$) type glass, and $P_2S_5$($Li_xP_yS_z$, $0<x<3$, $0<y<3$, $0<z<7$) type glass.

13. The organic/inorganic composite separator according to claim 1,
    wherein a weight ratio of the inorganic particles and the binder polymer is in the range from 50:50 to 99:1.

14. The organic/inorganic composite separator according to claim 1,
    wherein the porous coating layer has a thickness of 0.01 to 20 μm a pore size of 0.001 to 10 μm and a porosity of 10 to 90%.

15. The organic/inorganic composite separator according to claim 1,
    wherein the porous substrate is a polyolefin porous substrate.

16. The organic/inorganic composite separator according to claim 1,
    wherein the polyolefin porous substrate is famed using a polymer selected from the group consisting of polyethylene, polypropylene, polybutylene and polypentene.

17. The organic/inorganic composite separator according to claim 1,
wherein the porous substrate has a thickness of 5 to 50 μm, a pore size of 0.01 to 50 μm and a porosity of 10 to 95%.

18. An electrochemical device including a cathode, an anode, and a separator interposed between the cathode and the anode, wherein the separator is the organic/inorganic composite separator defined in claim 1.

19. The electrochemical device according to claim 18, wherein the electrochemical device is a lithium secondary battery.

* * * * *